(12) United States Patent
Hulyalkar et al.

(10) Patent No.: US 8,487,981 B2
(45) Date of Patent: Jul. 16, 2013

(54) METHOD AND SYSTEM FOR PROCESSING 2D/3D VIDEO

(75) Inventors: Samir Hulyalkar, Newtown, PA (US); Xuemin Chen, Rancho Santa Fe, CA (US); Marcus Kellerman, San Diego, CA (US); Ilya Klebanov, Thornhill, CA (US)

(73) Assignee: Broadcom Corporation, Irvine, CA (US)

( * ) Notice: Subject to any disclaimer, the term of this patent is extended or adjusted under 35 U.S.C. 154(b) by 817 days.

(21) Appl. No.: 12/554,416

(22) Filed: Sep. 4, 2009

(65) Prior Publication Data

US 2011/0058016 A1    Mar. 10, 2011

(51) Int. Cl.
*H04N 13/00* (2006.01)
(52) U.S. Cl.
USPC ......................................................... 348/42
(58) Field of Classification Search
USPC ...................... 348/42–51, 52–54; 375/240.16
See application file for complete search history.

(56) References Cited

U.S. PATENT DOCUMENTS

| | | | |
|---|---|---|---|
| 6,411,326 B1 * | 6/2002 | Tabata | 348/47 |
| 7,536,031 B2 * | 5/2009 | Wittebrood | 382/107 |
| 8,159,530 B2 * | 4/2012 | Watanabe et al. | 348/51 |
| 2005/0053147 A1 * | 3/2005 | Mukerjee et al. | 375/240.16 |
| 2005/0117637 A1 * | 6/2005 | Routhier et al. | 375/240.01 |
| 2005/0276484 A1 * | 12/2005 | Chen | 382/218 |
| 2007/0133682 A1 * | 6/2007 | Arai et al. | 375/240.16 |

* cited by examiner

*Primary Examiner* — Chirag R Patel
(74) *Attorney, Agent, or Firm* — Thomas Horstemeyer, LLP (57) ABSTRACT

A video processor decompresses stereoscopic left and right reference frames of compressed 3D video. New left and right frames are interpolated. The frames may be stored and/or communicated for display. The left and right frames are combined into a single frame of a single stream or may be sequenced in separate left and right streams. The left and right frames are interpolated based on the combined single stream and/or based on the separate left and right streams. Motion vectors are determined for one of the separate left or right streams. The frames are interpolated utilizing motion compensation. Areas of occlusion are determined in the separate left and right streams. Pixels are interpolated for occluded areas of left or right frames of separate streams from uncovered areas in corresponding opposite side frames. The left and right interpolated and/or reference frames are displayed as 3D and/or 2D video.

24 Claims, 6 Drawing Sheets

Frame rate up conversion for combined side by side right and left views

METHOD AND SYSTEM FOR PROCESSING 2D/3D VIDEO

CROSS-REFERENCE TO RELATED APPLICATIONS/INCORPORATION BY REFERENCE

Not applicable

FIELD OF THE INVENTION

Certain embodiments of the invention relate to communication systems. More specifically, certain embodiments of the invention relate to processing 2D/3D video.

BACKGROUND OF THE INVENTION

In 3D or 2D video systems, an image is presented in a display device, for example in a television, a monitor and/or a gaming console. Most video broadcasts, nowadays, utilize video processing applications that enable broadcasting video images in the form of bit streams that comprise information regarding characteristics of the image to be displayed. These video applications may utilize various interpolation and/or rate conversion functions to present content comprising still and/or moving images on a display. For example, de-interlacing functions may be utilized to convert moving and/or still images to a format that is suitable for certain types of display devices that are unable to handle interlaced content.

Interlaced 3D and/or 2D video comprises fields, each of which may be captured at a distinct time interval. A frame may comprise a pair of fields, for example, a top field and a bottom field. The pictures forming the video may comprise a plurality of ordered lines. During one of the time intervals, video content for the even-numbered lines may be captured. During a subsequent time interval, video content for the odd-numbered lines may be captured. The even-numbered lines may be collectively referred to as the top field, while the odd-numbered lines may be collectively referred to as the bottom field. Alternatively, the odd-numbered lines may be collectively referred to as the top field, while the even-numbered lines may be collectively referred to as the bottom field.

In the case of progressive 2D and/or 3D video frames, all the lines of the frame may be captured or played in sequence during one time interval. Interlaced video may comprise fields that were converted from progressive frames. For example, a progressive frame may be converted into two interlaced fields by organizing the even numbered lines into one field and the odd numbered lines into another field.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for processing 2D/3D video, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for processing 2D/3D video. One or more video processors and/or circuits may receive and may decompress stereoscopic left and right reference fields or frames of compressed video data. In addition, new left and right fields or frames may be created via interpolation based on the decompressed left and right reference fields or frames. The various fields or frames may comprise interlaced 3D video fields or may comprise progressive 3D video frames. The fields or frames may be referred to as frames, fields, video fields, and/or video frames. The interpolated left and right frames and/or the reference left and right frames may be stored and/or may be communicated for display. Moreover, the left and right reference frames and/or the interpolated left and right frames may be combined into a single frame and/or combined into a single stream of frames. Alternatively, the left and right reference frames and/or the interpolated left and right frames may be sequenced in separate left and right streams of frames. Furthermore, the left and right frames may be interpolated based on the combined single stream that may comprise the combined decompressed left and right reference frames. Alternatively, the left and right frames may be interpolated based on the separate left and right streams that may comprise the separate streams of the decompressed left and right reference frames. Motion vectors may be determined for at least one of the separate left and right streams of frames, which may be used for interpolation. Also, areas of occlusion may be determined in the separate left and right streams of frames. Left and right frames for the separate left and right streams may be interpolated utilizing motion compensation. Other techniques may be utilized as well, for example, blending pixels between a reference frame and/or other interpolated frames. Other approaches may comprise using wavelets or bandlets or object-based interpolation based on pixels in reference frames or other interpolated frames. Pixels may be interpolated in occluded areas of the left and right frames of the separate left and right streams utilizing uncovered areas in corresponding opposite side frames. The interpolated left and right frames and/or the left and right reference frames may be displayed as 3D and/or 2D video.

Figure 1:
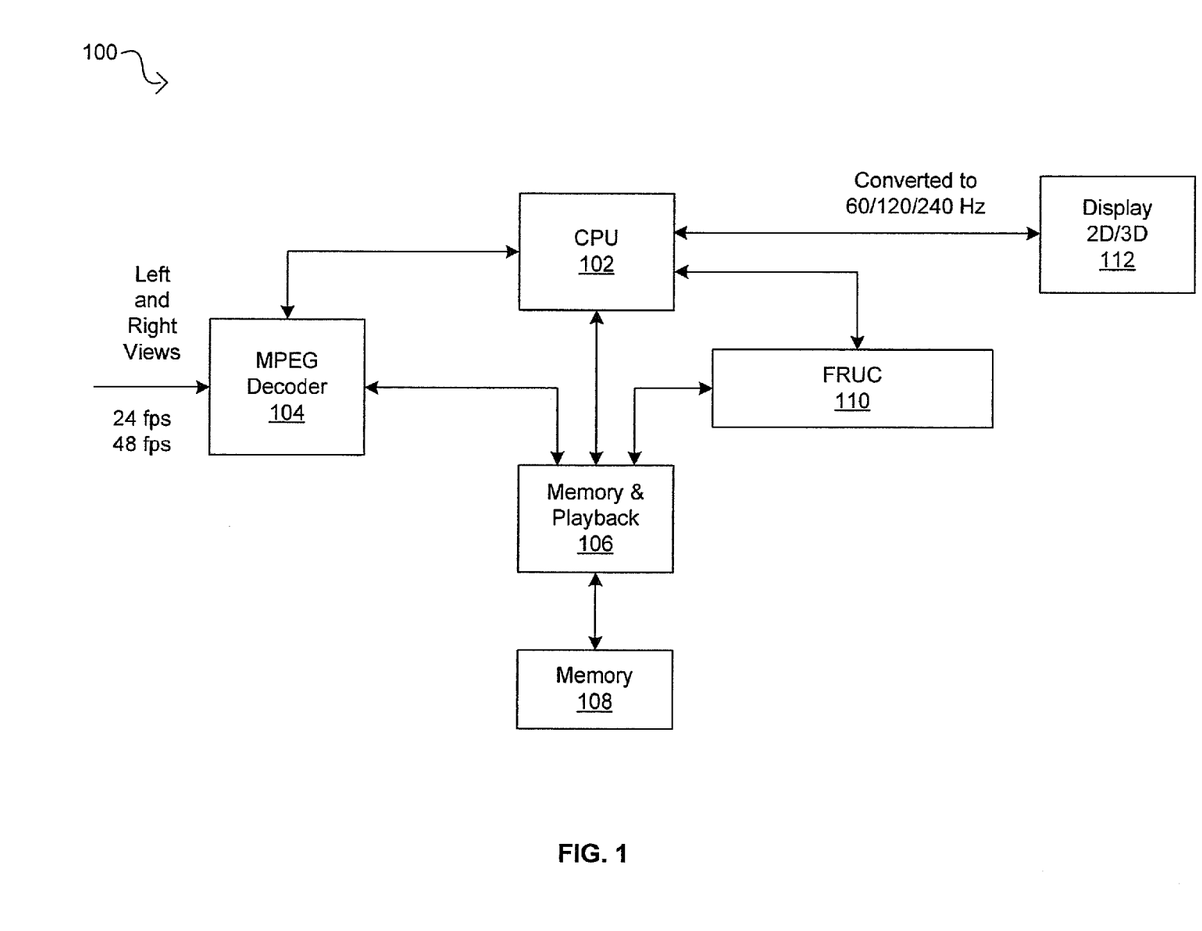
FIG. 1 is a block diagram illustrating an exemplary system that is operable to perform frame rate up-conversion for frames comprising left and/or right stereoscopic views, in accordance with an embodiment of the invention.

FIG. 1 is a block diagram illustrating an exemplary system that is operable to perform frame rate up-conversion for frames comprising left and/or right stereoscopic views, in accordance with an embodiment of the invention. Referring to FIG. 1 there is shown, a 3D video processing system 100, a CPU 102, an MPEG decoder 104, a memory and playback 106, a memory 108, a frame rate up-conversion module 110 and a display 112.

The 3D video processing system 100 may comprise suitable logic, circuitry, interfaces and/or code that may be operable to receive stereoscopic video data in a compression format and may render reconstructed video on the 2D and/or 3D display 112. The 3D video processing system 100 may be part of a set-top-box or tuner, a 2D and/or 3D television, a 3D digital camera, a DVD player and/or a gaming system, for example. The video processing system 100 may be operable to handle interlaced video fields and/or progressive video frames. For example, the 3D video processing system 100 may be operable to decompress and/or up-convert interlaced video and/or progressive video. The video fields, for example, interlaced fields and/or progressive video frames may be referred to as fields, video fields, frames or video frames.

The CPU 102 may comprise suitable logic, circuitry, interfaces and/or code that may be operable to process data and/or control operations of the 3D video processing system 100. In this regard, the CPU 102 may be operable to provide control signals to various other portions of the 3D video processing system 100, for example, to the MPEG decoder 104, the memory and playback module 106, the memory 108, the frame rate up-conversion module (FRUC) 110 and/or the display 112. The CPU 102 may also control data transfers between various portions of the 3D video processing system 100. The CPU 102 may enable execution of applications programs and/or code. In this regard, the applications, programs, and/or code may enable, for example, decompression, motion compensation operations, interpolation or otherwise processing 3D video data. Furthermore, the applications, programs, and/or code may enable, for example, configuring or controlling operation of the MPEG decoder and/or the FRUC 110 for example.

Figure 2A:
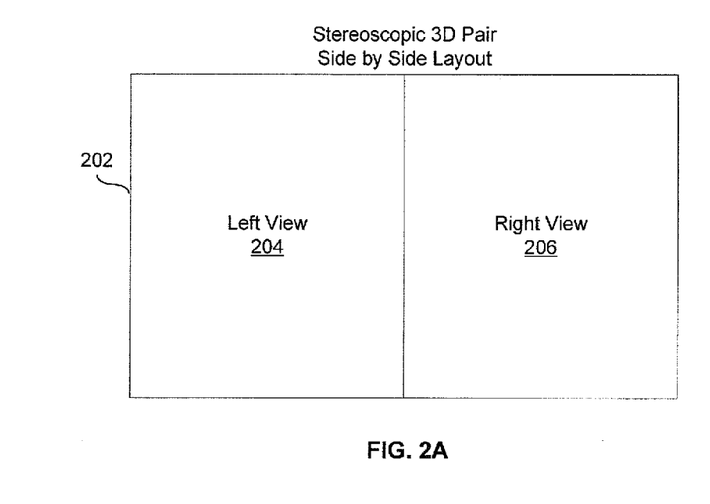
FIG. 2A is a block diagram that illustrates an exemplary frame that comprises side by side left and right stereoscopic views, in accordance with an embodiment of the invention.

The MPEG decoder 104 may comprise suitable logic, circuitry, interfaces and/or code that may be operable to decompress 3D video data and/or may handle security such as digital rights management. In this regard, the 3D video data may be received as left and/or right view stereoscopic video frames. The video data may be received based on MPEG-2 transport stream (TS) protocol or MPEG-2 program stream (PS) container formats, for example. In various embodiments of the invention, the left view data and the right view data are received in separate streams or separate files. In this instance, the MPEG decoder 104 may decompress the received separate left and right view video data based on, for example, MPEG-2 MVP, H.264 and/or MPEG-4 advanced video coding (AVC) or MPEG-4 multi-view video coding (MVC). In other embodiments of the invention, the stereoscopic left and right views may be combined into a single sequence of frames. For example, side-by-side, top-bottom and/or checkerboard lattice based 3D encoders may convert frames from a 3D stream comprising left view data and right view data into a single-compressed frame and may use MPEG-2, H.264, AVC and/or other encoding techniques. In this instance, the video data may be decompressed by the MPEG decoder 104 based on MPEG-4 AVC and/or MPEG-2 main profile (MP), for example. The MPEG decoder 104 may recreate the single-compressed frame and may processes it utilizing an appropriate decoder, for example, a decoder corresponding to the side-by-side, top-bottom or checkerboard lattice based 3D encoders. In this regard, the decoder may be chosen based on a corresponding encoding scheme that is used for compressing 3b content. Although a side-by-side encoder is described with respect to FIG. 2, the invention is not so limited and may comprise any suitable encoding and/or decoding techniques that generate a single frame from a pair of left and right view frames, for example, top-bottom and/or checkerboard techniques.

The memory and playback module 106 may comprise suitable logic, circuitry interfaces and/or code that may be operable to buffer 3D video data, for example, left and/or right views, while it is being transferred from one process to another. In this regard, the memory and playback module 106 may receive data from the MPEG decoder 104 and may transfer data to the FRUC 110. In addition, the memory and playback module 106 may buffer decompressed reference frames, for example, during frame interpolation by the FRUC 110. The memory and playback module 106 may exchange control signals with the CPU 102 for example and/or may write data to the memory 108 for longer term storage.

The memory 108 may comprise suitable logic, circuitry, interfaces and/or code that may operable to store information comprising parameters and/or code that may effectuate the operation of the 3D video processing system 100. The parameters may comprise configuration data and the code may comprise operational code such as software and/or firmware, but the information need not be limited in this regard. Additionally, the memory 108 may be operable to store 3D video data, for example, data that may comprise left and right views of stereoscopic image data.

The frame rate up-conversion module (FRUC) 110 may comprise suitable logic, circuitry, interfaces and/or code that may be operable to receive stereoscopic 3D video frames at one rate, for example, 24 or 48 fps, and output the frames at a higher rate, for example, at 60, 120 and/or 240 Hz. In this regard, the FRUC 110 may interpolate one or more frames that may be inserted between the received frames to increase the number of frames per second. The FRUC 110 may be operable to perform motion estimation and/or motion compensation in order to interpolate the frames. The FRUC 110 may be operable to handle stereoscopic left and right views that may be combined in a single frame and/or a single stream using, for example, a side-by-side 3D encoder and/or may be operable to handle separate streams of left and/or right views. In various embodiments of the invention, the FRUC 110 may be operable to handle occlusion areas in a first frame of a pair of left and right views utilizing a second of the pair of left and right views. For example, a right view frame may comprise scene information in an area that may be covered by a moving object in a corresponding left view frame. The specified scene information in the right field may be utilized to interpolate pixels in one or more left view frames when the area under the moving object has been uncovered.

The display 112 may comprise suitable logic, circuitry, interfaces and/or code that may be operable to receive reconstructed fields and/or frames of video data after processing in the FRUC 110 and may display it in a 3D mode and/or a 2D mode. In this regard, a 2D display may be operable to display video that was processed utilizing 3D techniques. In various embodiments of the invention, 3D video may need to be viewed with the aid of special lenses or devices such as 3D glasses. The stereoscopic fields and/or frames may be displayed and/or viewed based on polarization techniques and/or time sequence techniques, for example. In this regard, the display 112 may be a polarizing LCD display that may be 2D compatible and may require a viewer to wear polarized glasses. In other embodiments of the invention, the display 112 may be a DLP rear projector display or a high frame rate plasma display that may require shuttered glasses.

In operation, the MPEG decoder 104 may be operable to receive stereoscopic video data in a dual view compression format. For example, left and right stereoscopic views may be compressed in separate sequences or may be combined into a single sequence of frames in a side by side format, an over under format and/or a checkerboard format. The CPU 102 may generate control signals to enable processing and transfer of data to the various modules in the 3D video processing system 100. The MPEG decoder 104 may be operable to decompress the received stereoscopic video data and may buffer the decompressed data in the memory and playback 106. The decompressed video data may be read by FRUC 110. The FRUC 110 may perform motion compensation and/or may interpolate pixel data in one or more frames between the received frames in order to enable the frame rate up-conversion.

FIG. 2A is a block diagram that illustrates an exemplary frame that comprises side by side left and right stereoscopic views, in accordance with an embodiment of the invention. Referring to FIG. 2A, there is shown a video frame 202, a left view 204 and a right view 206.

The stereoscopic left and right views 204 and 206 of the video frame 202, may comprise two 2D images that may be generated by a pair of side by side 2D cameras where each 2D image corresponds to one eye of a viewer. The pair of left and right views 204 and 206 may each be derived from a sequence of images that may be captured in dual-view video format at 24 fps or 48 fps, for example. The pair of left and right views 204 and 206 may be arranged in a side by side layout in the single frame 202 that may be part of a single sequence of frames. The single frame 202 may comprise information from both left and right views 204 and 206 and may be compressed horizontally. Alternatively, a pair of left and right views may be arranged in an over under layout that may be compressed vertically. Prior to transport to the MPEG decoder 104, the left view 204 may be compressed and the right view 206 may be compressed within the frame 202. For example, the frame 202 may be compressed utilizing MPEG-4 AVC and/or MPEG-2 MP. The MPEG decoder 104 may receive the video frame 202 and may decompress the frame 202 MPEG-4 AVC and/or MPEG-2 MP.

Figure 2B:
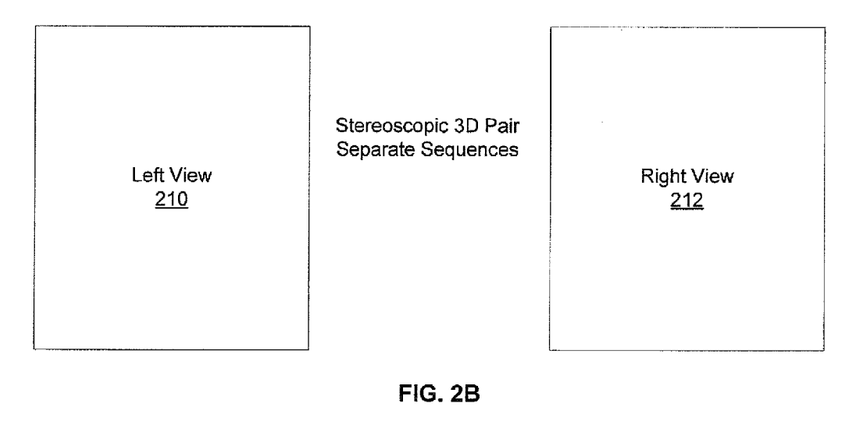
FIG. 2B is a block diagram that illustrates a pair of left and right stereoscopic views that may be received in two separate frames of two separate sequences, in accordance with an embodiment of the invention

FIG. 2B is a block diagram that illustrates a pair of left and right stereoscopic views that may be received in two separate frames of two separate sequences, in accordance with an embodiment of the invention. Referring to FIG. 2B, there is shown a left view 210 and a right view 212.

The stereoscopic left and right views 210 and 212 may comprise two 2D images generated by a pair of side by side 2D cameras in two separate frames. The pair of left and right views 210 and 212 may each be part of a separate sequence of video frames that may be formatted at 24 fps or 48 fps, for example. Prior to transport to the MPEG decoder 104, the separate left and right views 210 and 212 may be treated as 2D video and may be compressed and/or encoded based on MPEG-2 MVP, H.264, MPEG-4 AVC and/or MPEG-4 MVC. The left and right views 210 and 212 may be transported based on MPEG-2 TS and PS. Accordingly, the MPEG decoder 104 may receive separate frames of the left and right views 210 and 212 and may decompress them based on MPEG-2 MVP, H.264, MPEG-4 AVC and/or MPEG-4 MVC.

Figure 3:
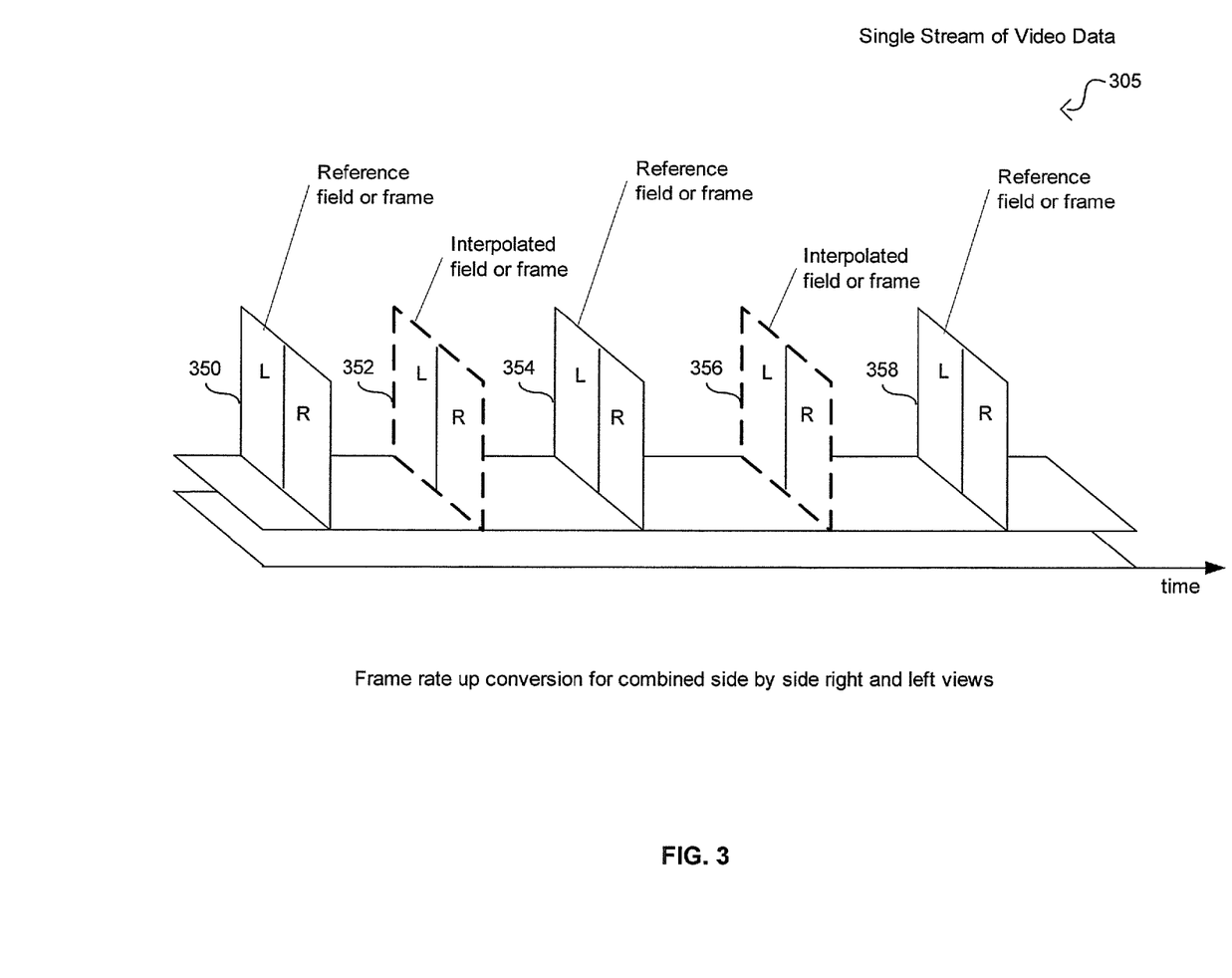
FIG. 3 is a block diagram illustrating an exemplary method that enables frame rate up-conversion of frames comprising combined side by side stereoscopic views, in accordance with an embodiment of the invention.

FIG. 3 is a block diagram illustrating exemplary steps for frame rate up-conversion of frames comprising combined side by side stereoscopic views, in accordance with an embodiment of the invention. Referring to FIG. 3, there is shown a single stream of video data 305 that may comprise three combined side by side reference frames 350, 354 and 358, in addition, there are two combined side by side interpolated frames 352 and 356.

The three combined side by side reference frames 350, 354 and 358 may be similar or substantially the same as the video frame 202 that may be decompressed and output from the MPEG decoder 104 as described with respect to FIG. 2A. The combined side by side interpolated frames 352 and 356 may be generated by the FRUC 110 from one or more of the reference frames 350, 354 and 358. Although only one interpolated frame is shown in between two reference frames, the invention is not so limited. For example a plurality of frames may be interpolated from one or more reference frames. For example, the reference frames 350, 354 and/or 358 may be separated in time in accordance with a 24 or 48 fps frame rate. The number of interpolated frames in between two reference frames may depend upon the desired output frame rate after up-conversion which may be, for example, 60, 120 or 240 Hz.

In operation, the FRUC 110 may treat the fields and frames comprising combined left and right views as 2D video would be treated during up conversion. In this regard, the FRUC 110 may, for example, generate the combined side by side interpolated frame 352 based on pixel information from the combined side by side reference frame 350 and/or 354. For example, the FRUC 110 may utilize collocated pixels and/or a plurality of pixels in a collocated neighborhood of the combined side by side reference frame 350 to interpolate a pixel in the combined side by side interpolated frame 352. Furthermore, the FRUC 110 may utilize motion estimation, motion compensation and/or other techniques described herein, for example, to find reference pixels in the one or both of the combined side by side reference frames 350 and/or 354 for interpolation pixels in the combined side by side interpolated frame 352. The single stream of video data 305 may be stored in the memory 108 or may be sent to the display 112.

Figure 4:
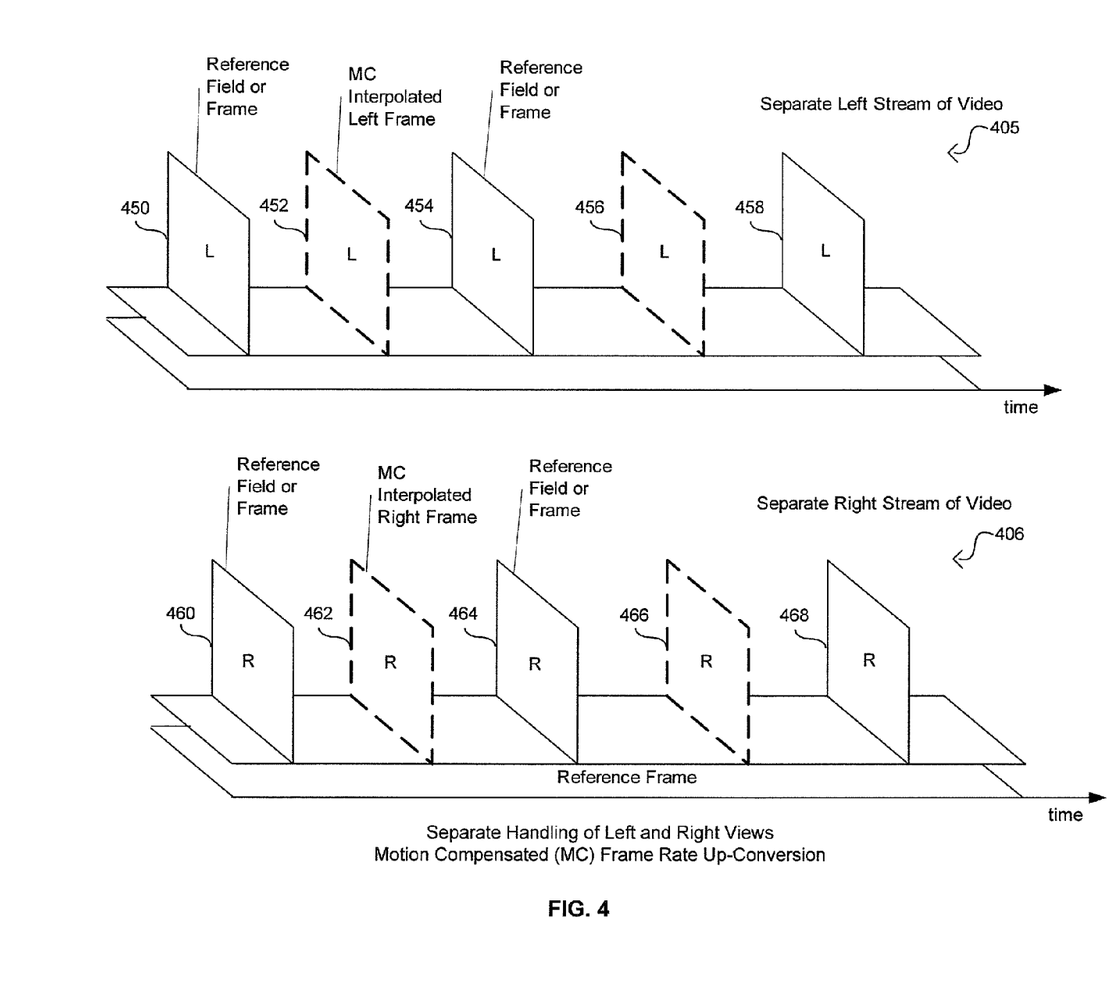
FIG. 4 is a block diagram illustrating an exemplary method that enables motion compensated frame rate up-conversion of separate streams of left and right stereoscopic views, in accordance with an embodiment of the invention.

FIG. 4 is a block diagram illustrating an exemplary method that enables motion compensated frame rate up-conversion of separate streams of left and right stereoscopic views, in accordance with an embodiment of the invention. Referring to FIG. 4, there is shown a separate left stream of video data 405 that may comprise three left reference frames 450, 454 and 456 and two left interpolated frames 452 and 456. In addition, there is shown a separate right stream of video data 406 that may comprise three right reference frames 460, 464 and/or 468 and two right interpolated frames 462 and 464.

The three left reference frames 450, 454 and 458 may be similar or substantially the same as the video frame 210 that may be decompressed and output from the MPEG decoder 104 as described with respect to FIG. 2B. The three right reference frames 460, 464 and 468 may be similar or substantially the same as the video frame 212 that may be decompressed and output from the MPEG decoder 104 as described with respect to FIG. 2B. The separated sequences or streams of interpolated left frames 452 and 456 may be generated by the FRUC 110 from one or more of the left reference frames 450, 454 and/or 458. Similarly, the interpolated right frames 462 and 466 may be generated by the FRUC 110 from one or more of the right reference frames 460, 464 and/or 468. In various embodiments of the invention, for example, during occlusion handling, a portion of a right reference frame may be utilized to interpolate a portion of a left frame and vice versa. Although only one interpolated frame is shown in between two reference frames, the invention is not so limited and any suitable number of frames may be interpolated in between reference frames according to the conversion rate.

In operation, true frame rate up-conversion, for example, one or more up-conversion techniques that may be performed on 2D video streams, may be utilized for up-conversion with regard to the separate left stream of video data 405 and with regard to the right stream of video data 406. In this regard, motion estimation may be performed on one stream and the results of the motion estimation, for example, motion vectors may be utilized for motion compensation in both streams. For example, motion vectors that may be determined for the left video stream 405 may be utilized for motion compensation on the left video stream 405 and/or on the right video stream 406.

Moreover, prior to interpolating fields and/or frames based on motion compensation, the FRUC 110 may be operable to perform occlusion handling. For example, the FRUC 110 may be operable to determine an area of occlusion in the left reference frame 450. In this regard, the FRUC 110 may be operable to determine a specified occluded area in the left reference frame 450 that may be covered by an object where the object moves away and/or uncovers the specified occluded area in the left interpolated frame 452. In this regard, the left reference frame 450 may not comprise information for interpolating pixels in the specified uncovered area of the left interpolated frame 452. In some instances, a corresponding right reference frame, for example, the right reference frame 460 may comprise information in an area corresponding to the specified occluded area of the left reference frame. This may be possible because a camera that captures the right video stream of data 406 may view the specified area from a different angle than the camera that captures the left video stream of data 405. The FRUC 110 may be operable to utilize the information from the corresponding area in the right reference frame 460 to interpolate pixels in the uncovered area of the left interpolated frame 452.

The FRUC 110 may be operable to interpolate pixels in the left interpolated frame 452 based on motion compensated pixels from one or more left reference frames, for example, the left reference frames 450 and/or 454. Moreover, the FRUC 110 may be operable to interpolate pixels in the interpolated frame 452 for that correspond to occluded areas of one or both of the reference frames 450 and 454 based on motion compensated pixels from the one or more of the right reference frames 460 and 464. In various embodiments of the invention, other methods of interpolation may be utilized, for example, in some instances, pixels, fields and/or frames may simply be repeated.

The left stream of video data 405 and/or the right video stream of video data 406 may be stored in the memory 108 or may be sent to the display 112.

Figure 5:
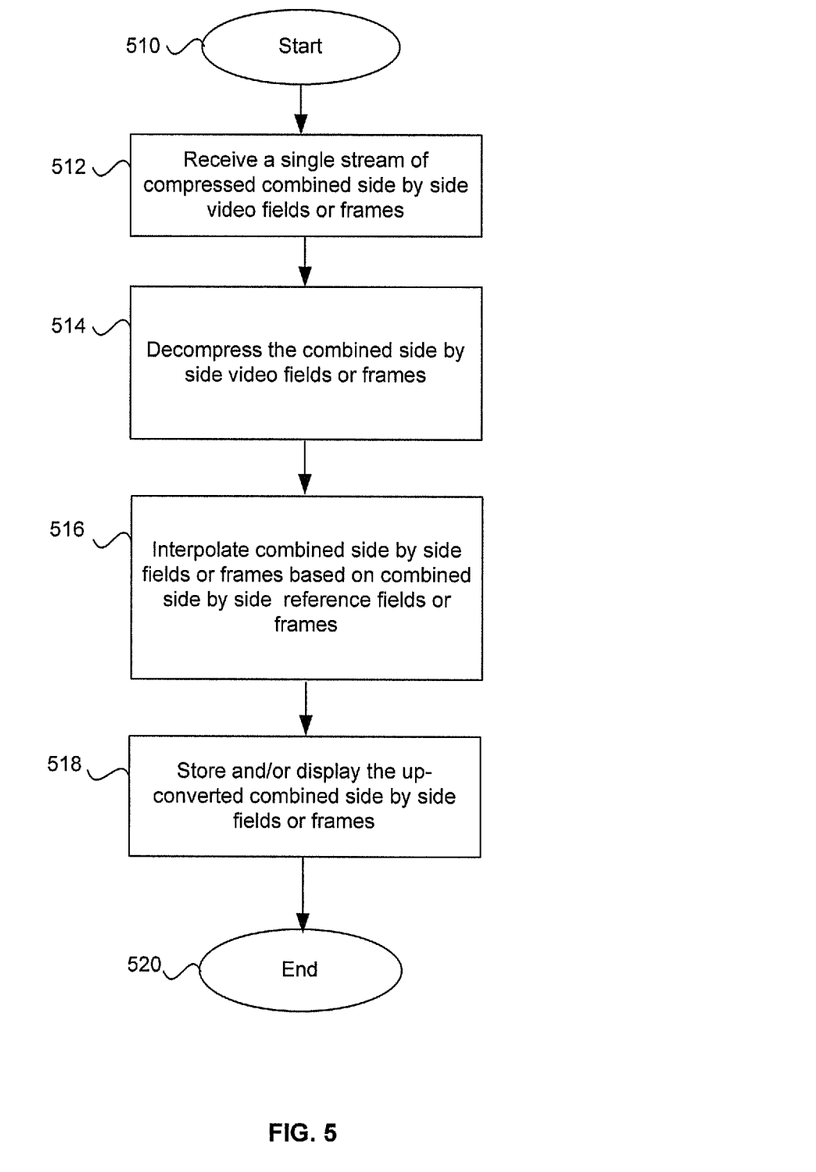
FIG. 5 is a flow chart illustrating exemplary steps for performing frame rate up-conversion on a stream of frames comprising side by side left and right stereoscopic views, in accordance with an embodiment of the invention.

FIG. 5 is a flow chart illustrating exemplary steps for performing frame rate up-conversion on a stream of frames comprising side by side left and right stereoscopic views, in accordance with an embodiment of the invention. The exemplary steps may begin with step 510. In step 512, the MPEG decoder 104 may receive a single stream of compressed combined side by side video frames that may be similar to the combined left and right view frame 202. In step 514, the MPEG decoder 104 may decompress the combined side by side video frames. In step 516, the FRUC 110 may interpolate combined side by side frames, for example, the combined side by side interpolated frames 352 and/or 356 based on combined side by side reference frames for example, the combined reference frames 350, 354 and/or 358. In step 518, the up-converted combined side by side fields or frames may be stored in memory 108 and/or displayed in the display 112. The exemplary steps may end at step 520.

Figure 6:
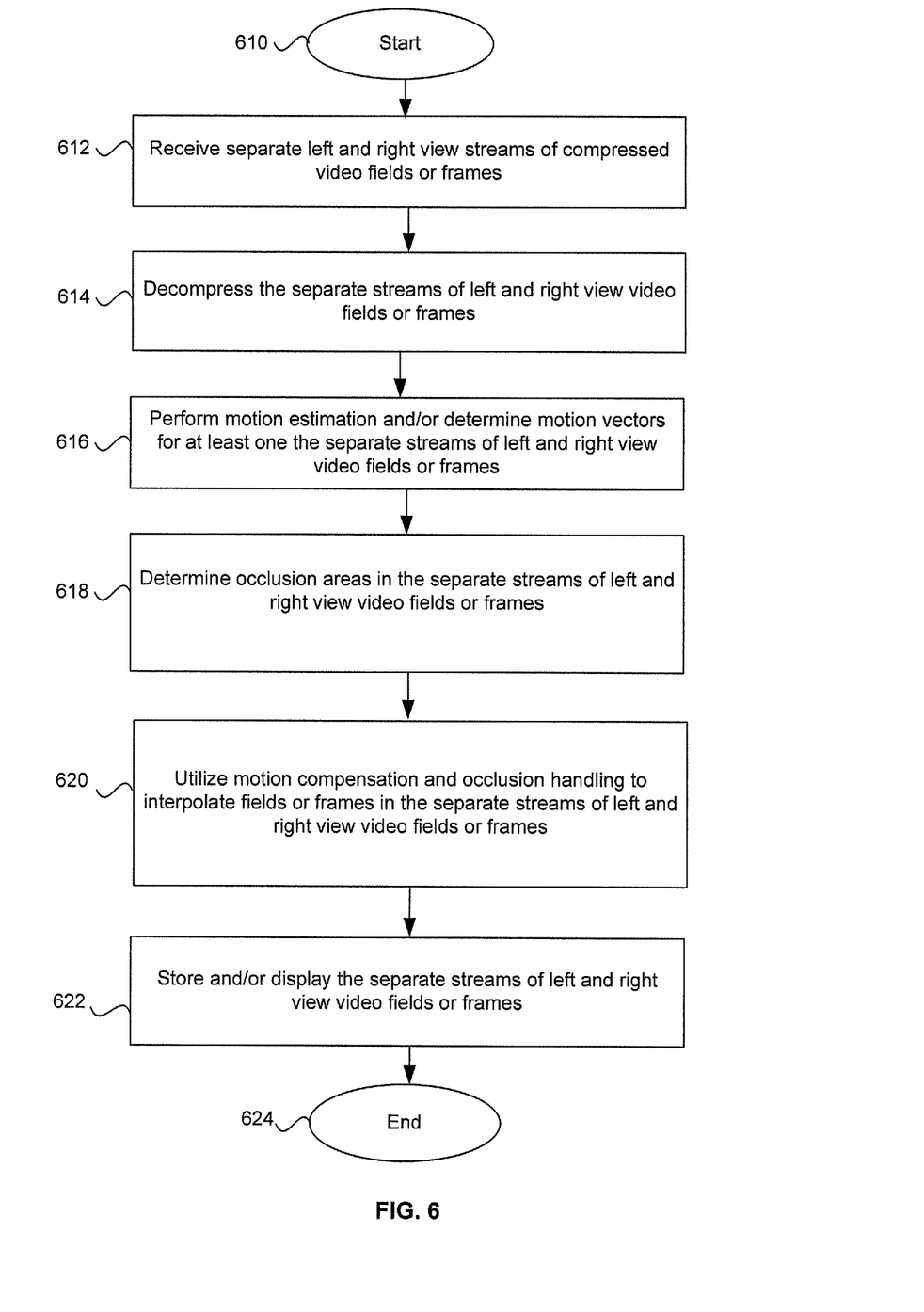
FIG. 6 is a flow chart illustrating exemplary steps for performing frame rate up-conversion on separate streams of stereoscopic left view frames and right view frames, in accordance with an embodiment of the invention.

FIG. 6 is a flow chart illustrating exemplary steps for performing frame rate up-conversion on separate streams of stereoscopic left view frames and right view frames, in accordance with an embodiment of the invention. The exemplary steps may begin with step 610. In step 612, separate left and right view streams of compressed video frames, for example, the separate video steams 405 and 406, may be received by the MPEG decoder 110. In step 614, the separate streams of left and right view video frames may be decompressed. In step 616, the FRUC 110 may perform motion estimation and/or may determine motion vectors for at least one the separate streams of left and right view video frames. In step 618, occlusion areas may be determined in the separate streams of left and right view video frames. In step 620, motion compensation and occlusion handling may be utilized to interpolate frames in the separate streams of left and right view video frames. In step 622, the separate streams of left and right view video fields or frames may be stored in the memory 108 and/or sent to the display 112. The exemplary steps may end at step 624.

In an embodiment of the invention, one or more video processors and/or circuits, for example, the 3D video processing system 100, may receive and may decompress stereoscopic left and right reference frames of compressed video data, for example, one or more of the reference fields or frames 350, 354 and 358 and/or one or of the reference fields or frames 450, 454, 458, 460, 464 and 468. In addition, new left and right fields or frames may be interpolated based on the decompressed left and right reference fields or frames, for example, 352 and 356 and/or 452, 456, 462 and 466. The various fields or frames may be referred to as frames, fields, video fields, and/or video frames. The interpolated left and right frames and/or the reference left and right frames may be stored, for example, in the memory 103 and/or may be communicated for display, for example, to the 2D and/or 3D display 112. Moreover, the left and right reference frames and/or the interpolated left and right frames may be combined into a single frame and/or combined into a single stream of frames, for example, the single stream of video data 305. Alternatively, the left and right reference frames and/or the interpolated left and right frames may be sequenced in separate left and right streams of frames, for example, as in the separate left stream of video data 405 and the separate right stream of data 406. Furthermore, the left and right frames may be interpolated based on the combined single stream 305 that may comprise the combined decompressed left and right reference frames 350 354, 358. Alternatively, the left and right frames may be interpolated based on the separate left and right streams 405 and/or 406 that may comprise the separate streams of the decompressed left and right reference frames 450, 454, 458 and 460, 464, 468. Motion vectors may be determined for at least one of the separate left and right streams of frames 405 and/or 406. Also, areas of occlusion may be determined in the separate left and right streams of frames 405 and/or 406. The left and right frames in the separate left and right streams 405 and/or 406 may be interpolated utilizing motion compensation. Pixels may be interpolated in occluded areas of the left and right frames of the separate left and right streams 405 and/or 406 utilizing uncovered areas in corresponding opposite side frames. The interpolated left and right frames and/or the left and right reference frames may be displayed as 3D and/or 2D video.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for processing 2D/3D video.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video, the method comprising:
   performing by one or more processors, one or more circuits, or any combination thereof:
   receiving stereoscopic left and right reference fields or frames of compressed video data;
   decompressing the left and right reference fields or frames of compressed video data;
   determining areas of occlusion in separate left and right streams of fields or frames;
   interpolating left and right fields or frames in the separate left and right streams of fields or frames based at least in part on said separate streams of decompressed left and right reference fields or frames and the areas of occlusion to produce a plurality of interpolated pixel values for each left and right fields or frames, the interpolated pixel values for the left fields or frames based on a left and right reference field or frame, the interpolated pixel values for the right fields or frames based on a left and right reference field or frame; and
   storing or communicating for display, the interpolated left and right fields or frames or said left and right reference fields or frames, or both.

2. The method according to claim 1, wherein the left and right reference fields or frames or said interpolated left and right fields or frames are combined in a single field or frame or in a single stream of fields or frames.

3. The method according to claim 1, wherein said left and right reference fields or frames or said interpolated left and right fields or frames are sequenced in the separate left and right streams of fields or frames.

4. The method according to claim 1, comprising interpolating said left and right fields or frames in a combined single stream of left and right fields or frames based on a combined said decompressed left and right reference fields or frames.

5. The method according to claim 1, comprising determining motion vectors for at least one of said left and right streams of said separate left and right streams of fields or frames, wherein interpolating said left and right fields or frames in said separate left and right streams of fields or frames is based on at least the motion vectors.

6. The method according to claim 1, comprising interpolating said left and right fields or frames in said separate left and right streams of fields or frames utilizing motion compensation.

7. The method according to claim 1, comprising interpolating pixels in occluded areas of said left and right fields or frames in said separate left and right streams of fields or frames utilizing uncovered areas in corresponding opposite side fields or frames in said separate left and right streams.

8. The method according to claim 1, comprising displaying said interpolated left and right fields or frames or said left and right reference fields or frames as 3D video or 2D video.

9. A system for processing video, the system comprising:
   one or more processors, one or more circuits, or any combination thereof, in a video processing device, wherein the one or more processors, one or more circuits, or any combination thereof, are operable to:
   receive stereoscopic left and right reference fields or frames of compressed video data;
   decompress the left and right reference fields or frames of compressed video data;
   determine areas of occlusion in separate left and right streams of fields or frames;
   interpolate left and right fields or frames in the separate left and right streams of fields or frames based at least in part on separate streams of the decompressed left and right reference fields or frames and the areas of occlusion to produce a plurality of interpolated pixel values for each left and right fields or frames, the interpolated pixel values for the left fields or frames based on a left and right reference field or frame, the interpolated pixel values for the right fields or frames based on a left and right reference field or frame; and
   store or display said interpolated left and right fields or frames or said left and right reference fields or frames, or both.

10. The system according to claim 9, wherein said left and right reference fields or frames or said interpolated left and right fields or frames are combined in a single field or frame or in a single stream of fields or frames.

11. The system according to claim 9, wherein said left and right reference fields or frames or said interpolated left and right fields or frames are sequenced in the separate left and right streams of fields or frames.

12. The system according to claim 9, wherein the one or more processors or circuits are operable to interpolate the left and right fields or frames in a combined single stream of left and right fields or frames based on a combined decompressed left and right reference fields or frames.

13. The system according to claim 9, wherein said one or more processors or circuits are operable to determine motion vectors for at least one of said left and right streams of said separate left and right streams of fields or frames, and wherein said one or more processors or circuits are operable to interpolate said left and right fields or frames in said separate left and right streams of fields or frames is based on at least the motion vectors.

14. The system according to claim 9, wherein said one or more processors or circuits are operable to interpolate said left and right fields or frames in said separate left and right streams of fields or frames utilizing motion compensation.

15. The system according to claim 9, wherein said one or more processors or circuits are operable to interpolate pixels in occluded areas of said left and right fields or frames in said separate left and right streams of fields or frames utilizing uncovered areas in corresponding opposite side fields or frames in said separate left and right streams.

16. The system according to claim 9, wherein said one or more processors or circuits are operable to display said interpolated left and right fields or frames or said left and right reference fields or frames as 3D video or 2D video.

17. A non-transitory computer-readable medium embodying a program executable in a computing device, the program configured to at least:
   receive stereoscopic left and right reference fields or frames of compressed video data;
   decompress the left and right reference fields or frames of compressed video data;
   determine areas of occlusion in separate left and right streams of fields or frames;
   interpolate left and right fields or frames in the separate left and right streams of fields or frames based at least in part on separate streams of said decompressed left and right reference fields or frames and the areas of occlusion to produce a plurality of interpolated pixel values for each left and right fields or frames, the interpolated pixel values for the left fields or frames based on a left and right reference field or frame, the interpolated pixel values for the right fields or frames based on a left and right reference field or frame; and
   store or display the interpolated left and right fields or frames or said left and right reference fields or frames, or both.

18. The computer-readable medium according to claim 17, wherein the left and right reference fields or frames or the interpolated left and right fields or frames are combined in a single field or frame or in a single stream of fields or frames.

19. The computer-readable medium according to claim 17, wherein said left and right reference fields or frames or said interpolated left and right fields or frames are sequenced in the separate left and right streams of fields or frames.

20. The computer-readable medium according to claim 17, further comprising code that interpolates said left and right fields or frames in a combined single stream of left and right fields or frames based on a combined said decompressed left and right reference fields or frames.

21. The computer-readable medium according to claim 17, wherein the program is further configured to:
   determine motion vectors for at least one of the left and right streams of the separate left and right streams of fields or frames; and
   interpolate the left and right fields or frames in the separate left and right streams of fields or frames is based on at least the motion vectors.

22. The computer-readable medium according to claim 17, wherein the program is further configured to interpolate the left and right fields or frames in the separate left and right streams of fields or frames utilizing motion compensation.

23. The computer-readable medium according to claim 17, wherein the program is further configured to interpolate pixels in occluded areas of the left and right fields or frames in the separate left and right streams of fields or frames utilizing uncovered areas in corresponding opposite side fields or frames in the separate left and right streams.

24. The computer-readable medium according to claim 17, wherein the program is further configured to interpolate the left and right fields or frames or the left and right reference fields or frames as 3D video or 2D video.

* * * * *